J. A. STEFFENS.
PROCESS OF OBTAINING COMPLETE ALCOHOLYSIS.
APPLICATION FILED APR. 5, 1921.
1,433,308.
Patented Oct. 24, 1922.
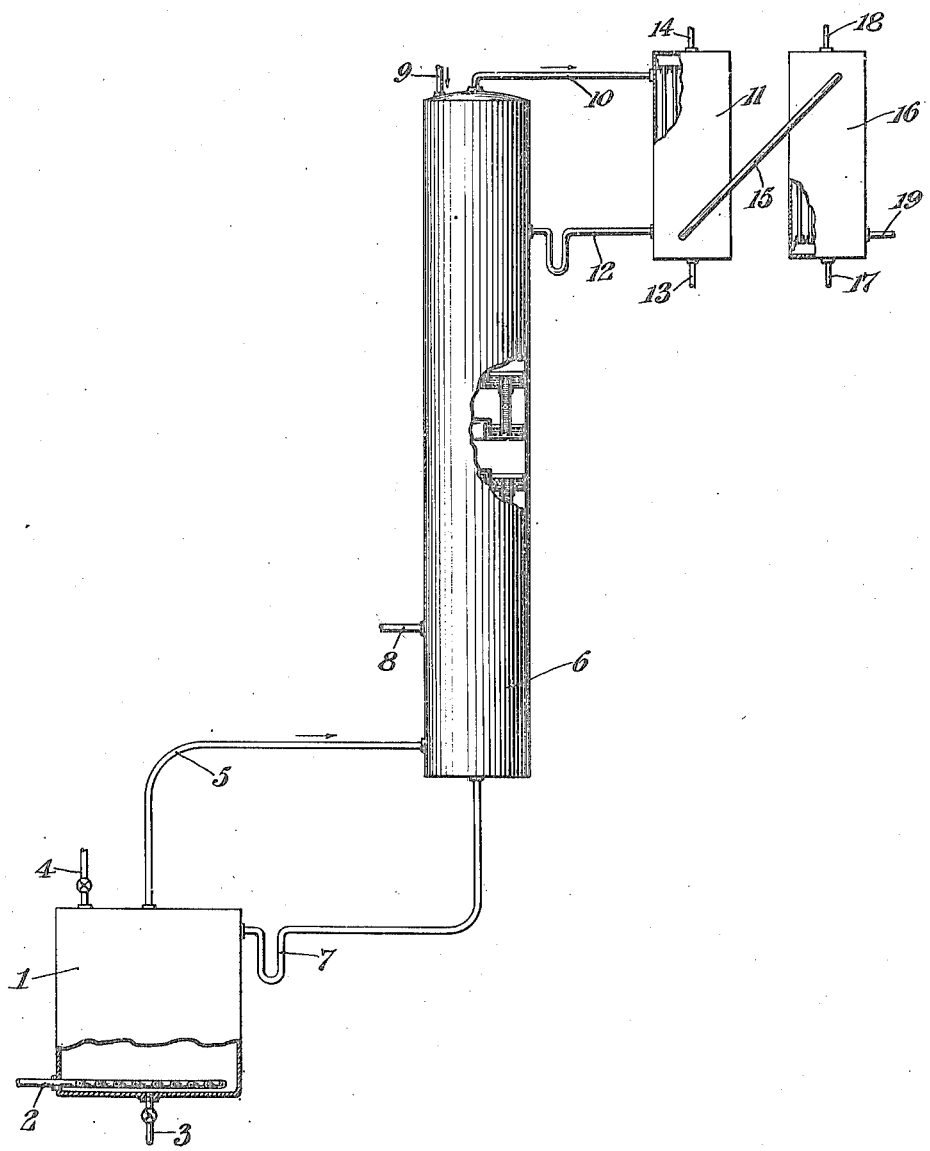

Patented Oct. 24, 1922.

1,433,308

UNITED STATES PATENT OFFICE.

JOHN A. STEFFENS, OF BALTIMORE, MARYLAND, ASSIGNOR TO U. S. INDUSTRIAL ALCOHOL CO., A CORPORATION OF WEST VIRGINIA.

PROCESS OF OBTAINING COMPLETE ALCOHOLYSIS.

Application filed April 5, 1921. Serial No. 458,836.

*To all whom it may concern:*

Be it known that I, JOHN A. STEFFENS, a citizen of the United States, residing at Baltimore and State of Maryland, have invented certain new and useful Improvements in Processes of Obtaining Complete Alcoholysis, of which the following is a specification.

My invention relates particularly to a process whereby complete alcoholysis may be obtained, that is to say, in which an alcohol reacts upon an ester under conditions such that the ester is completely changed over to a new ester containing instead of the basic radical of the ester treated the corresponding basic radical of the alcohol.

The object of my invention is to provide a process whereby an ester may be treated with an alcohol in such a way as to completely substitute the basic radical thereof with the corresponding basic radical of the alcohol added. In other words, the object of my invention is to carry the reaction not only beyond the point of equilibrium but to completion. In order to accomplish this I provide reacting materials which do not contain as an impurity any of the alcohol such as is formed in the reaction, so that by the removal of the alcohol formed the reaction mixture may be kept free from the alcohol. This may be accomplished, for example, by removing the alcohol in the form of a constant boiling mixture containing the alcohol and some of the ester added to the reaction mixture. I have been able to accomplish this by using ethyl acetate free from alcohol. Preferably, the alcohol used is a higher alcohol than the alcohol formed in the reaction to enable the latter to be readily removed. Another object is to arrange the process so that it is continuous.

Further objects of my invention will appear from the detailed description thereof contained hereinafter.

While my invention is capable of being carried out in various ways, to illustrate the invention, I shall describe only certain ways of conducting the same hereinafter, and while it is capable of being carried out with various types of apparatus I have shown only one type of apparatus for use therewith in the accompanying drawings, in which—

The figure is a diagrammatic representation of an apparatus which may be used in carrying out my invention.

In the drawings I have shown a pot still 1 heated by a steam coil 2 and having a valved draw-off pipe 3 at the bottom thereof. If it should be desired to operate the apparatus with a batch process, I provide a valved inlet pipe 4 at the top of the still 1, and through the pipe 4 I introduce a reaction mixture containing 677 lbs. of amyl alcohol and 1450 lbs. of ethyl acetate free from impurities such, for example, as ethyl alcohol together with a quantity of sulfuric acid having a strength of 66° Bé. amounting to from .3 to 5% of the other constituents by weight. Preferably, however, the process is operated continuously and the materials used in the continuous process would then be introduced at another part of the apparatus as hereinafter described. The vapors evolved from the still 1 pass out of the same by means of a pipe 5 to a rectifying column 6 which has a liquid sealed return pipe 7 for returning amyl acetate to the still 1. In the continuous process, the amyl acetate is formed as a result of the introduction of one-half to three-quarters of the ethyl acetate referred to above, through a pipe 8 located near the bottom of the column 6 and the remainder of the reaction mixture through a pipe 9 at the top of the column. The vapors from the column pass out by a pipe 10 to a dephlegmator 11 having a liquid sealed return pipe 12 leading to the column. The dephlegmator 11 is cooled in the usual way with the aid of water passing through inlet and outlet pipes 13 and 14. Vapors from the dephlegmator pass through a pipe 15 to a condenser 16 cooled with water passing through inlet and outlet pipes 17 and 18. The condensate passes out through a pipe 19.

In the operation of my process, assuming the same to be continuous, the mixture of sulfuric acid and amyl alcohol together with from one-quarter to one-half of the ethyl acetate are introduced at the top of the column 6 while the remainder of the ethyl acetate is introduced near the bottom thereof. Heat being applied to such of the materials as reach the still 1, which is maintained at a boiling temperature amyl acetate is formed in the column 6 and in the still 1 and the vapors of a constant boiling mixture containing approximately 30% by weight of ethyl alcohol and 70% by weight of ethyl acetate pass up through the pipe 5 into the column 6 and then through the dephlegmator 11 to the condenser 16, where the condensed constant boiling mixture is recovered. The ethyl alcohol formed in the reaction is thus being continually removed and the reaction is therefore conducted not only beyond the equilibrium stage but to actual completion, especially because of the use of ethyl acetate free from ethyl alcohol, the same alcohol as the alcohol formed in the reaction. In order to obtain a purer product vacuum distillation may be applied to the ester. The product obtained is anhydrous and is a good solvent. In this way very large yields of the amyl acetate are obtainable and the process rendered available for effective commercial use. The removal of the one or more of the end products from the reaction mixture may be accomplished in any desired way, as, for example, by distillation, salting out, extracting, washing, precipitation with the addition of a third material or by decomposition thereof. In the particular process described in detail above, however, the process is so arranged as to form an alcohol that boils at a lower point than the alcohol added to the reaction mixture so as to enable it to be readily removed by distillation.

Other esters than amyl acetate may be produced by the use of different materials. For example, instead of the ethyl acetate in the above reaction I may use ethyl butyrate, ethyl propionate, ethyl valerate, ethyl tartrate, ethyl oxalate, propyl acetate, propyl butyrate, propyl propionate, propyl valerate, propyl tartrate or propyl oxalate; also instead of the amyl alcohol I may use propyl alcohol, butyl alcohol, glycerine or glycol. Also, other catalysts may be used instead of sulfuric acid such as other mineral acids, for example hydrochloric acid, also sodium alcoholate, sodium hydroxide or barium hydroxide, and when anhydrous esters are used, metallic sodium may be the catalyst utilized.

While I have described my invention above in detail it is to be understood that various changes are possible therein without departing from the spirit of the invention.

I claim:

1. The process of manufacturing an ester comprising allowing alcohol to react with an ester having a radical forming an alcohol possessing a lower boiling point than the alcohol added, and distilling off the alcohol as it is formed in order to upset the equilibrium and carry the reaction to completion, the ester being present in excess so that the alcohol is distilled off in a constant boiling mixture with the ester.

2. The process of manufacturing an alkyl ester comprising allowing an aliphatic alcohol to react with an alkyl ester of a fatty acid having a radical forming an alcohol possessing a lower boiling point than the aliphatic alcohol added, distilling off the alcohol as it is formed in order to upset the equilibrium and carry the reaction to completion, the ester being present in excess so that the alcohol is distilled off in a constant boiling mixture with the ester.

3. The process which comprises reacting upon ethyl acetate with amyl alcohol so as to form another ester and another alcohol and carrying the reaction beyond the point of equilibrium to completion.

4. The process which comprises reacting upon ethl acetate with amyl alcohol so as to form another ester and another alcohol and carrying the reaction beyond the point of equilibrium to completion, the ester when added being free from the alcohol formed in the reaction.

5. The process which comprises reacting upon ethyl acetate with amyl alcohol so as to form another ester and another alcohol and removing a quantity of one of the products formed.

6. The process which comprises reacting upon ethyl acetate with amyl alcohol so as to form another ester and another alcohol and removing a quantity of the alcohol formed.

7. The process which comprises reacting upon ethyl acetate with amyl alcohol so as to form another ester and another alcohol and removing a quantity of the alcohol formed by distillation.

8. The process which comprises reacting upon ethyl acetate with amyl alcohol so as to form another ester and another alcohol and removing a quantity of the alcohol formed by distillation so as to remove a constant boiling mixture of the amyl alcohol and the ethyl ester added.

9. The process which comprises reacting upon an ester with an alcohol so as to form another ester and another alcohol and carrying the reaction beyond the point of equilibrium to completion, the process being carried out continuously by the continuous addition of the ester and the alcohol added.

10. The process which comprises reacting upon an ester with an alcohol so as to form another ester and another alcohol and carrying the reaction beyond the point of equilibrium to completion, the ester when added being free from the alcohol formed in the reaction, the process being carried out continuously by the continuous addition of the ester and the alcohol added.

11. The process which comprises reacting upon ethyl acetate with amyl alcohol so as to form another ester and another alcohol and carrying the reaction beyond the point of equilibrium to completion, the process being carried out continuously by the continuous addition of the ethyl ester and the amyl alcohol added.

12. The process which comprises reacting upon ethyl acetate with amyl alcohol so as to form another ester and another alcohol and carrying the reaction beyond the point of equilibrium to completion, the ester when added being free from the alcohol formed in the reaction, the process being carried out continuously by the continuous addition of the ethyl ester and the amyl alcohol added.

13. The process which comprises reacting upon ethyl acetate with amyl alcohol so as to form another ester and another alcohol and removing a quantity of one of the products formed, the process being carried out continuously by the continuous addition of the ethyl ester and the amyl alcohol added.

14. The process of manufacturing amyl acetate comprising allowing amyl alcohol and an excess of ethyl acetate to react while distilling off in a constant boiling mixture with the ethyl alcohol produced in order to carry the reaction to completion.

15. The process which comprises reacting upon ethyl acetate with amyl alcohol so as to form another ester and another alcohol and removing a quantity of the alcohol formed by distillation, the process being carried out continuously by the continuous addition of the ethyl ester and the amyl alcohol added.

16. The process which comprises reacting upon ethyl acetate with amyl alcohol so as to form another ester and another alcohol and removing a quantity of the alcohol formed by distillation so as to remove a constant boiling mixture of the alcohol and the ester added, the process being carried out continuously by the continuous addition of the ethyl ester and the amyl alcohol added.

In testimony that I claim the foregoing, I have hereunto set my hand this 26th day of January, 1921.

JOHN A. STEFFENS.